(12) United States Patent
Kim

(10) Patent No.: US 12,571,772 B2
(45) Date of Patent: Mar. 10, 2026

(54) APPARATUS AND METHOD FOR ANALYZING MODE CHANGE OF UNIDIRECTIONAL COMPOSITE MATERIALS

(71) Applicant: PUKYONG NATIONAL UNIVERSITY INDUSTRY-UNIVERSITY COOPERATION FOUNDATION, Busan (KR)

(72) Inventor: Chan Jung Kim, Busan (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 493 days.

(21) Appl. No.: 18/190,735

(22) Filed: Mar. 27, 2023

(65) Prior Publication Data

US 2023/0314384 A1 Oct. 5, 2023

(30) Foreign Application Priority Data

Mar. 29, 2022 (KR) ........................ 10-2022-0038500

(51) Int. Cl.
*G01N 29/12* (2006.01)
*G01N 29/04* (2006.01)
*G01N 29/44* (2006.01)

(52) U.S. Cl.
CPC ........... *G01N 29/12* (2013.01); *G01N 29/045* (2013.01); *G01N 29/44* (2013.01); *G01N 2291/0231* (2013.01)

(58) Field of Classification Search
None
See application file for complete search history.

(56) References Cited

U.S. PATENT DOCUMENTS

2018/0372488 A1* 12/2018 Winfree ................ G01B 21/16

FOREIGN PATENT DOCUMENTS

CN 107357992 A * 11/2017 ............. G06F 30/23

OTHER PUBLICATIONS

English machine translation of CN 107357992 A (Year: 2017).*

* cited by examiner

*Primary Examiner* — Walter L Lindsay, Jr.
*Assistant Examiner* — Geoffrey T Evans
(74) *Attorney, Agent, or Firm* — NORTON ROSE FULBRIGHT US LLP

(57) ABSTRACT

A method for analyzing change in a mode of a unidirectional composite material includes applying a physical force of a predetermined pattern onto a unidirectional composite material specimen; sensing a vibration signal generated by the physical force at at least one sensed position thereof; performing modal analysis of a frequency response at a corresponding measurement location, based on the physical force applied to the specimen and the vibration signal measured at the sensed position of the specimen, and calculating at least one mode shape vector of the specimen based on the modal analysis result; compensating the calculated mode shape vector based on a distance between a normal line passing through a center of the specimen and the sensed position, thereby calculating a modified mode shape vector; and calculating a first modal assurance criterion (MAC) of the specimen based on the modified mode shape vector.

13 Claims, 9 Drawing Sheets

Table A2. Mode shape vector of UCBC #1 specimen. (*i*: imaginary unit).

| Mode 1 | Mode 2 | Mode 3 | Mode 4 | Mode 5 |
|---|---|---|---|---|
| −8.57 − 2.65*i* | 5.62 + 0.92*i* | −10.15 − 0.40*i* | −6.39 + 3.48*i* | 12.38 − 0.17*i* |
| −13.34 − 4.28*i* | −4.91 − 3.69*i* | 5.01 − 1.20*i* | −0.11 + 1.33*i* | 11.14 + 0.32*i* |
| −1.49 + 0.87*i* | 1.54 + 0.07*i* | 2.38 + 0.15*i* | 6.92 + 0.63*i* | −2.80 + 0.08*i* |
| −4.28 + 2.52*i* | −1.20 − 1.86*i* | 0.32 − 0.42*i* | 0.36 + 1.34*i* | −3.13 + 0.22*i* |
| −2.93 + 1.94*i* | −1.26 − 0.32*i* | 1.24 − 0.41*i* | −0.31 − 2.31*i* | −2.79 + 0.23*i* |
| 2.94 − 2.74*i* | 0.85 + 4.32*i* | −5.38 + 0.73*i* | −7.66 − 0.64*i* | −1.94 − 0.24*i* |
| −9.69 + 2.88*i* | −5.62 + 0.06*i* | −2.55 − 0.52*i* | 2.44 + 1.54*i* | 10.73 − 0.00*i* |
| −10.58 + 0.79*i* | 5.70 − 0.31*i* | 9.60 − 1.21*i* | 0.58 − 2.45*i* | 10.47 + 0.25*i* |
| 16.66 − 4.28*i* | −0.10 + 0.34*i* | 5.92 − 0.84*i* | −3.25 − 1.50*i* | −0.11 + 0.17*i* |
| 16.53 − 0.83*i* | 0.13 − 0.49*i* | −5.81 − 0.19*i* | 4.33 − 0.42*i* | 0.16 − 0.06*i* |

Modal parameters of 304SS specimen.

| Resonance Frequency (Hz) | Modal Damping Ratio (%) | Mode Shape |
|---|---|---|
| 647.2 | 0.6 | Bending (first) |
| 734.5 | 0.6 | Twisting (first) |
| 1601 | 0.8 | Twisting (second) |
| 1773.2 | 0.6 | Bending (second) |
| 2341.2 | 0.6 | Bending (third) |

FIG. 11

| Specimen | Resonance frequency (Hz) | Modal damping ratio (%) | MAC | Mode type |
|---|---|---|---|---|
| UCBC #1 ($\theta_1 = 0°$) | 1,961.6 | 5.4 | 82.7 | Bending (first) |
| | 318.0 | 3.8 | 97.2 | Torsional (first) |
| | 1,064.5 | 2.7 | 86.1 | Torsional (second) |
| | 3,103.6 | 5.8 | 51.7 | Bending (second) |
| | 884.1 | 2.3 | 77.3 | Bending (third) |
| UCBC #2 ($\theta_2 = 30°$) | 2,539.4 | 7.4 | 55.5 | Bending (first) |
| | 306.5 | 2.3 | 42.0 | Torsional (first) |
| | 749.3 | 2.5 | 56.2 | Torsional (second) |
| | 2,162.1 | 4.4 | 52.9 | Bending (second) |
| | 1,199.8 | 2.1 | 44.2 | Bending (third) |
| UCBC #3 ($\theta_3 = 45°$) | 285.7 | 2.6 | 49.4 | Bending (first) |
| | 520.0 | 1.9 | 80.3 | Torsional (first) |
| | 721.1 | 1.9 | 53.4 | Torsional (second) |
| | 2,069.3 | 3.4 | 65.4 | Bending (second) |
| | 1,688.0 | 2.3 | 83.8 | Bending (third) |
| UCBC #4 ($\theta_4 = 60°$) | 267.6 | 3.0 | 64.8 | Bending (first) |
| | 387.1 | 2.3 | 91.8 | Torsional (first) |
| | 881.6 | 2.2 | 79.4 | Torsional (second) |
| | 680.8 | 3.4 | 39.6 | Bending (second) |
| | 2,504.9 | 4.8 | 72.2 | Bending (third) |
| UCBC #5 ($\theta_5 = 90°$) | 158.3 | 3.5 | 64.1 | Bending (first) |
| | 2,480.5 | 5.2 | 83.5 | Torsional (first) |
| | 336.0 | 6.0 | 72.8 | Torsional (second) |
| | 425.6 | 4.0 | 87.6 | Bending (second) |
| | 2,581.1 | 0.7 | 35.9 | Bending (third) |

FIG. 12

| Specimen | Modified mode shape | | Original mode shape | | Mode type |
|---|---|---|---|---|---|
| | Each MAC | Averaged MAC | Each MAC | Averaged MAC | |
| UCBC #1 $(\theta_1 = 0°)$ | 82.7 | | 73.7 | | Bending (first) |
| | 97.2 | | 81.6 | | Torsional (first) |
| | 86.1 | 79.0 | 80.3 | 69.4 | Torsional (second) |
| | 51.7 | | 35.5 | | Bending (second) |
| | 77.3 | | 76.1 | | Bending (third) |
| UCBC #2 $(\theta_2 = 30°)$ | 55.5 | | 46.7 | | Bending (first) |
| | 42.0 | | 66.1 | | Torsional (first) |
| | 56.2 | 50.2 | 73.7 | 65.7 | Torsional (second) |
| | 52.9 | | 71.1 | | Bending (second) |
| | 44.2 | | 70.7 | | Bending (third) |
| UCBC #3 $(\theta_3 = 45°)$ | 49.4 | | 65.9 | | Bending (first) |
| | 80.3 | | 78.2 | | Torsional (first) |
| | 53.4 | 66.5 | 63.2 | 65.0 | Torsional (second) |
| | 65.4 | | 64.3 | | Bending (second) |
| | 83.8 | | 53.2 | | Bending (third) |
| UCBC #4 $(\theta_4 = 60°)$ | 64.8 | | 88.8 | | Bending (first) |
| | 91.8 | | 93.3 | | Torsional (first) |
| | 79.4 | 69.6 | 66.8 | 67.9 | Torsional (second) |
| | 39.6 | | 47.9 | | Bending (second) |
| | 72.2 | | 42.9 | | Bending (third) |
| UCBC #5 $(\theta_5 = 90°)$ | 64.1 | | 81.8 | | Bending (first) |
| | 83.5 | | 53.3 | | Torsional (first) |
| | 72.8 | 68.8 | 95.8 | 64.6 | Torsional (second) |
| | 87.6 | | 82.4 | | Bending (second) |
| | 35.9 | | 9.8 | | Bending (third) |

FIG. 13

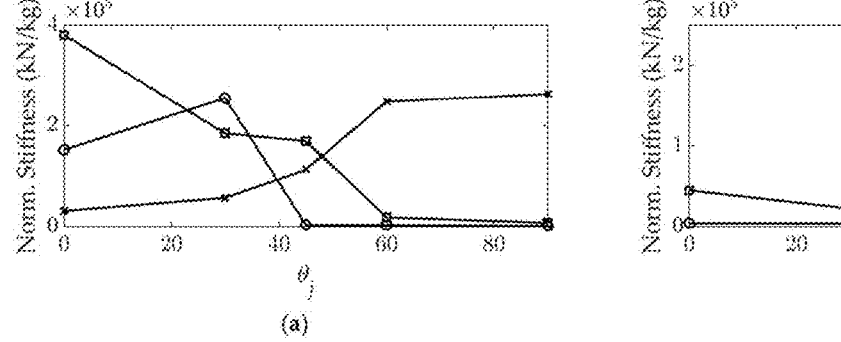

Variations in the structural stiffness considering only MAC values: (a) bending modes, ─○─: first bending mode; ─□─: second bending mode; ─✕─: third bending mode; (b) twisting modes, ─○─: first twisting mode; ─□─: second twisting mode.

Variations in the viscous damping coefficient considering only MAC values: (a) bending modes, ··⊖··: first bending mode; ··□··: second bending mode; ··✕··: third mode; (b) twisting modes, ··⊖··: first twisting mode; ··□··: second twisting mode.

APPARATUS AND METHOD FOR ANALYZING MODE CHANGE OF UNIDIRECTIONAL COMPOSITE MATERIALS

CROSS-REFERENCE TO RELATED APPLICATION

This application claims a benefit under 35 U.S.C. § 119(a) of Korean Patent Application No. 10-2022-0038500 filed on Mar. 29, 2022, on the Korean Intellectual Property Office, the entire disclosure of which is incorporated herein by reference for all purposes.

BACKGROUND

1. Field

The present disclosure relates to a method and device for analyzing mode change of a unidirectional composite material. More particularly, the present disclosure relates to a method and device for analyzing mode change of a unidirectional composite material, wherein the method and the device are capable of observing change in a modal parameter of a material whose structural stiffness is reinforced in a specific direction.

2. Description of Related Art

A composite material refers to combination of different kinds of materials and has properties that may not be obtained from a single material. Unlike a single material, the composite material may not be uniform in terms of a microstructure and may not be continuous and may have multiphases. The composite material may be largely divided into particle reinforced materials, fiber reinforced materials, and structural composite materials.

The composite material has physical or chemically enhanced properties compared to the single material. Light and strong composite material may be produced. However, physical properties of the composite material are greatly affected by a structure of the material or a type of the material.

A carbon-based composite material (CBC material) is used in various industrial fields due to its high stiffness and damping quality. For example, a carbon fiber reinforced material is light and strong, and is used in fields requiring weight reduction, such as aerospace and automobile fields.

However, a structure of the carbon-based composite material using carbon fibers changes depending on an orientation of the carbon fiber. Thus, the structural stiffness or damping quality of the composite material is dominantly influenced by the carbon fiber. For example, dynamic behavior of the carbon fiber reinforced material may change due to the anisotropic nature of the material depending on the carbon fiber. Thus, a resonance frequency and a mode shape thereof change. Further, the structural stiffnesses of a composite structure having the same shape is reinforced in varying directions, such that the mode shape thereof changes due to the influence of the stiffness reinforcing direction. In the prior art, it may be identified that modal parameter information change depending on whether the structural stiffness is reinforced or the direction in which the structural stiffness is reinforced. However, there is a problem in that how a parameter corresponding to an order of a mode of interest changes cannot be specifically examined.

A prior art related to the present disclosure includes Japanese Patent Application Publication No. 2015-032295 (2015.02.16)

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

A purpose of the present disclosure is to provide a method and device for analyzing mode change of a unidirectional composite material, wherein the method and device can examine change in a modal parameter of a material whose structural stiffness is reinforced in a specific direction.

A purpose of the present disclosure is to provide a method and device for analyzing mode change of a unidirectional composite material, wherein the method and device can minimize shape information change of each mode caused by structural stiffness reinforcing and can effectively examine change of each mode using a modal assurance criterion (MAC).

A purpose of the present disclosure is to provide a method and device for analyzing mode change of a unidirectional composite material, wherein the method and device can predict dynamic behavior when the structural stiffness is reinforced in a specific direction even without fabricating a specimen and testing the same.

Purposes in accordance with the present disclosure are not limited to the above-mentioned purpose. Other purposes and advantages in accordance with the present disclosure as not mentioned above may be understood from following descriptions and more clearly understood from embodiments in accordance with the present disclosure. Further, it will be readily appreciated that the purposes and advantages in accordance with the present disclosure may be realized by features and combinations thereof as disclosed in the claims.

A first aspect of the present disclosure provides a method for analyzing change in a mode of a unidirectional composite material, the method comprising: applying a physical force of a predetermined pattern onto one side of a unidirectional composite material specimen; sensing a vibration signal generated by the physical force at at least one sensed position of the specimen; performing modal analysis of a frequency response at a corresponding measurement location, based on the physical force applied to the specimen and the vibration signal measured at the sensed position of the specimen, and calculating at least one mode shape vector of the specimen based on the modal analysis result; compensating the calculated mode shape vector based on a distance between a normal line passing through a center of the structure of the specimen and the sensed position, thereby calculating a modified mode shape vector; and calculating a first modal assurance criterion (MAC) of the specimen based on the modified mode shape vector.

In one implementation of the first aspect, the specimen includes a unidirectional carbon-based composite structure (UCBC) whose structural stiffness is reinforced in a single direction of an angle θ.

In one implementation of the first aspect, the specimen includes the unidirectional carbon-based composite structure (UCBC) whose structural stiffness is reinforced in a single direction of one of 0 degree, 30 degrees, 45 degrees, 60 degrees and 90 degrees.

In one implementation of the first aspect, performing the modal analysis of the frequency response includes calculating a frequency response function using a following Equation 1 based on the physical force applied to the specimen and the vibration signal measured at the sensed position of the specimen:

$$H_{mn}^i(\omega, \theta) = \frac{r_{mn}^j}{(\omega_{n,i}(\theta))^2 - \omega^2 + 2\omega\omega_{n,i}(\theta)\xi_{n,i}(\theta)j} \qquad \text{[Equation 1]}$$

where $\omega_{n,i}$ denotes a resonance frequency of an i-th mode, $\xi_i$ denotes a modal damping ratio of the i-th mode, i is a natural number, $\theta$ denotes the angle, w denotes the frequency, $r_{mn}^i$ denotes a residual of the i-th mode, and j denotes an imaginary unit.

In one implementation of the first aspect, calculating the modified mode shape vector includes: calculating a distance vector of a following Equation 2 based on the distance between the at least one sensed position and the normal line; and calculating a normalized distance vector using a following Equation 3:

$$d_z(\theta) = \frac{|\cot(\theta)z_x - z_y|}{\sqrt{(\cot(\theta))^2 + 1}} \qquad \text{[Equation 2]}$$

$$D(\theta) = [\, d_1(\theta) \quad d_z(\theta) \quad \dots \quad d_{N-1}(\theta) \quad d_N(\theta) \,]$$

where $Z(z_x, z_y)$ denotes a coordinate of the sensed position, $d_z$ denotes the distance between the normal line and the sensed position Z, and $D(\theta)$ denotes the distance vector, $$\hat{W}(\theta) = \frac{D(\theta)}{\max(D(\theta))} \qquad \text{[Equation 3]}$$

where $W(\theta)$ denotes the normalized distance vector.

In one implementation of the first aspect, calculating the modified mode shape vector includes calculating the modified mode shape vector using a following Equation 4 based on the normalized distance vector:

$$\varphi_j^m = ((\varphi_j)^T \cdot \text{diag}(\hat{W}))^T \qquad \text{[Equation 4]}$$

where $(\varphi_j)^T$ denotes a transpose vector of the mode shape vector $\varphi_j$, and diag(A) denotes a diagonal matrix of a matrix A.

In one implementation of the first aspect, calculating the first modal assurance criterion of the specimen using the modified mode shape vector includes calculating the first modal assurance criterion using a following Equation 5:

$$MAC(i, j) = \frac{|(\varphi_i^m)^T(\varphi_j^m)^*|^2}{((\varphi_i^m)^T(\varphi_i^m)^*)((\varphi_j^m)^T(\varphi_j^m)^*)} \qquad \text{[Equation 5]}$$

where $(\varphi_i^m)^T$ denotes a transpose matrix of an i-th modified mode shape $\varphi_i^m$, and $(\varphi_i^m)^*$ denotes a conjugate matrix of the i-th modified mode shape $\varphi_i^m$, and $(\varphi_j^m)^T$ and $(\varphi_j^m)^*$ represent a transpose matrix and a conjugate matrix of a j-th mode shape $\varphi_j^m$, respectively.

In one implementation of the first aspect, calculating the first modal assurance criterion of the specimen using the modified mode shape vector includes calculating the first modal assurance criterion between the modified mode shape vector of the specimen and a mode shape vector of an isotropic material, based on the modified mode shape vector of the specimen and the mode shape vector of the isotropic material.

In one implementation of the first aspect, the method further comprises calculating a second modal assurance criterion of the specimen using a following Equation 6 based on the mode shape vector calculated via the modal analysis of the frequency response:

$$MAC(i, j) = \frac{|(\varphi_i)^T(\varphi_j)^*|^2}{((\varphi_i)^T(\varphi_i)^*)((\varphi_j)^T(\varphi_j)^*)} \qquad \text{[Equation 6]}$$

where $(\varphi_i)^T$ denotes a transpose matrix of an i-th mode shape vector $\varphi_i$ and $(\varphi_i)^*$ denotes a conjugate matrix of the i-th mode shape vector $\varphi_i$, and $(\varphi_j)^T$ and $(\varphi_j)^*$ represent a transpose matrix and a conjugate matrix of a j-th mode shape vector $\varphi_j$, respectively.

In one implementation of the first aspect, calculating the second modal assurance criterion of the specimen includes calculating the second modal assurance criterion between the mode shape vector of the specimen and a mode shape vector of an isotropic material, based on the mode shape vector of the specimen and the mode shape vector of the isotropic material.

A second aspect of the present disclosure provides a device for analyzing change in a mode of a unidirectional composite material, the device comprising: a vibration exciter configured to set a vibration excitation pattern under control, and apply a physical force to one side of a unidirectional composite material specimen according to the set vibration excitation pattern; a sensor for measuring a vibration signal generated at the specimen due to the physical force at at least one sensed position of the specimen; a modal analyzer for performing modal analysis on a frequency response at a corresponding measurement position based on the physical force applied to the specimen and the vibration signal measured at the sensed position of the specimen, and calculating at least one mode shape vector of the specimen based on the modal analysis result; a modified mode shape vector calculator for compensating the mode shape vector calculated by the modal analyzer to calculate a modified mode shape vector; and a first modal assurance criterion calculator for calculating a first modal assurance criterion (MAC) based on the calculated modified mode shape vector, wherein the modified mode shape vector calculator is configured to compensate the mode shape vector calculated by the modal analyzer based on a distance between a normal line passing through a center of the structure of the specimen and the sensed position, thereby calculating the modified mode shape vector.

In one implementation of the second aspect, the first modal assurance criterion calculator is configured to calculate the first modal assurance criterion using a following Equation 7:

$$MAC(i, j) = \frac{|(\varphi_i^m)^T(\varphi_j^m)^*|^2}{((\varphi_i^m)^T(\varphi_i^m)^*)((\varphi_j^m)^T(\varphi_j^m)^*)} \qquad \text{[Equation 7]}$$

where $(\varphi_i^m)^T$ denotes a transpose matrix of an i-th modified mode shape $\varphi_i^m$, and $(\varphi_i^m)^*$ denotes a conjugate matrix of the i-th modified mode shape $\varphi_i^m$, and $(\varphi_j^m)^T$ and $(\varphi_j{}^m)^*$ represent a transpose matrix and a conjugate matrix of a j-th mode shape $\varphi_j{}^m$, respectively.

In one implementation of the second aspect, the device further comprises a second modal assurance criterion calculator configured to calculate a second modal assurance criterion of the specimen based on the mode shape vector calculated by the modal analyzer.

In one implementation of the second aspect, the second modal assurance criterion calculator is configured to calculate the second modal assurance criterion using a following Equation 8:

$$MAC(i, j) = \frac{\left|(\varphi_i)^T(\varphi_j)^*\right|^2}{\left((\varphi_i)^T(\varphi_i)^*\right)\left((\varphi_j)^T(\varphi_j)^*\right)} \qquad \text{[Equation 8]}$$

where $(\varphi_i)^T$ denotes a transpose matrix of an i-th mode shape vector $\varphi_i$ and $(\varphi_i)^*$ denotes a conjugate matrix of the i-th mode shape vector $\varphi_i$, and $(\varphi_j)^T$ and $(\varphi_j)^*$ represent a transpose matrix and a conjugate matrix of a j-th mode shape vector $\varphi_j$, respectively.

As described above, the method and device for analyzing mode change of the unidirectional composite material can examine change in a modal parameter of a material whose structural stiffness is reinforced in a specific direction.

Further, the method and device for analyzing mode change of the unidirectional composite material can minimize shape information change of each mode caused by structural stiffness reinforcing and can effectively examine change of each mode using a modal assurance criterion (MAC).

Moreover, the method and device for analyzing mode change of the unidirectional composite material can predict dynamic behavior when the structural stiffness is reinforced in a specific direction even without fabricating a specimen and testing the same.

When it is guaranteed that an influence of the reinforcing of the structural stiffness of a given composite structure in a specific direction on the mode shape is linear, the method and device for analyzing the mode change of the unidirectional composite material according to the present disclosure may also be effective in predicting the dynamic behavior of the composite structure whose the structural stiffness is reinforced in a plurality of directions.

In addition to the effects as described above, specific effects in accordance with the present disclosure will be described together with the detailed description for carrying out the disclosure.

BRIEF DESCRIPTION OF DRAWINGS

FIG. 11 is a table showing a modal parameter and a modal assurance criterion (MAC) as calculated on the UCBC specimen.

FIG. 12 is a table showing a modal assurance criterion (MAC) of a mode shape vector before modification and a modal assurance criterion (MAC) of a modified mode shape vector on the UCBC specimen.

FIG. 13 is a diagram showing change in structural stiffness of the UCBC specimen.

DETAILED DESCRIPTIONS

Figure 1:
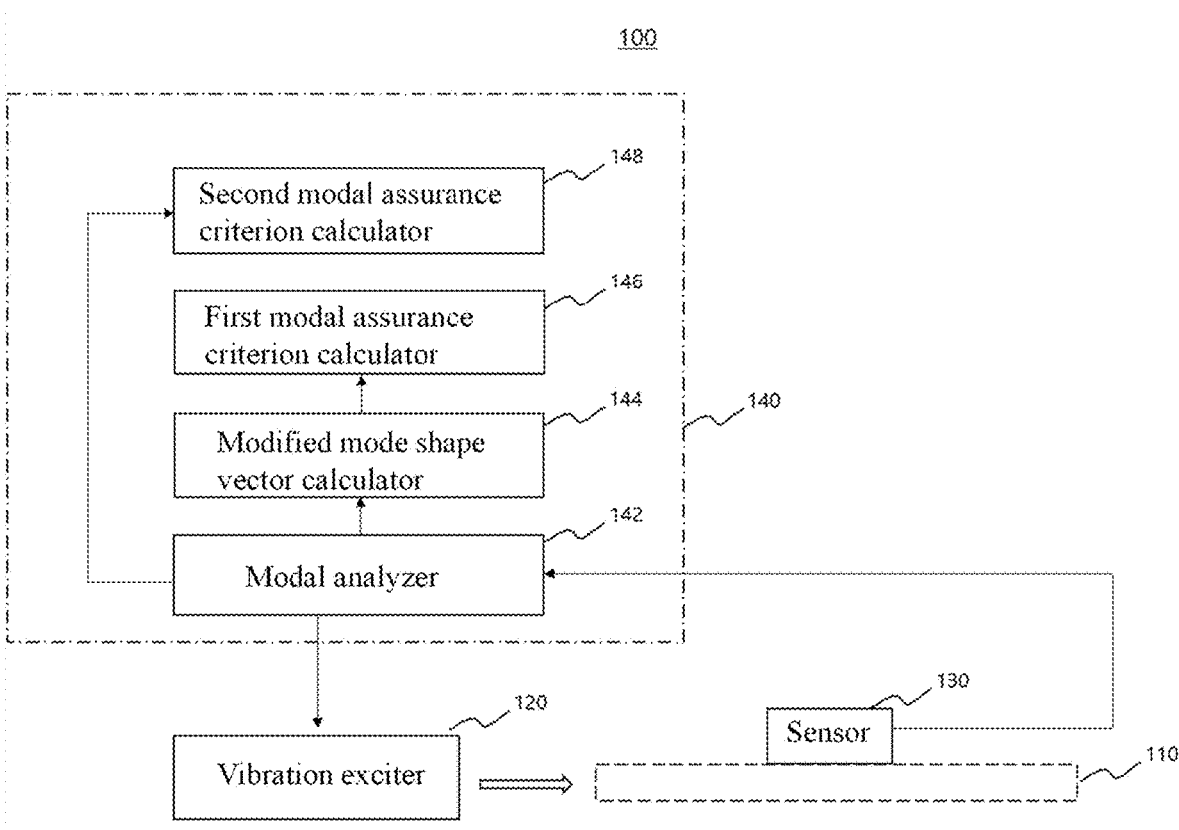
FIG. 1 is a block diagram showing a configuration of a device for analyzing mode change of a unidirectional composite material according to an embodiment of the present disclosure.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for illustrating embodiments of the present disclosure are illustrative, and the present disclosure may not be limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one example, when a certain embodiment may be implemented differently, a function or operation specified in a specific block may occur in a sequence different from that specified in a flowchart. For example, two consecutive blocks may be actually executed at the same time. Depending on a related function or operation, the blocks may be executed in a reverse sequence.

In descriptions of temporal relationships, for example, temporal precedent relationships between two events such as "after", "subsequent to", "before", etc., another event may occur therebetween unless "directly after", "directly subsequent" or "directly before" is not indicated.

The features of the various embodiments of the present disclosure may be partially or entirely combined with each other, and may be technically associated with each other or operate with each other. The embodiments may be implemented independently of each other and may be implemented together in an association relationship.

Hereinafter, a method and device for analyzing the mode change of the unidirectional composite material according to the present disclosure will be described.

FIG. 1 is a configuration diagram showing a configuration of a device for analyzing the mode change of the unidirectional composite material according to an embodiment of the present disclosure.

Referring to FIG. 1, a device 100 for analyzing the mode change of the unidirectional composite material may include a vibration exciter 120, a sensor 130, and a mode change analyzer 140. The mode change analyzer 140 may include a modal analyzer 142, a modified mode shape vector calculator 144, a first modal assurance criterion (MCA) calculator 146, and a second modal assurance criterion calculator 148.

When the structural stiffness of the carbon-based composite material (CBC material) is reinforced in a single direction and thus the CBC material has a large structural stiffness in the single direction, a mode shape of the material may change. When the mode shape change may be minimized by correcting the change in the mode shape, change in a modal parameter (a resonance frequency and a modal damping coefficient) when the structural stiffness is reinforced in a specific direction may be observed using a modal assurance criterion (MAC) indicating a correlation between mode shapes as a single value.

The device 100 for analyzing the mode change of the unidirectional composite material may analyze the mode change of the carbon-based composite material in which the structural stiffness is reinforced in a single direction. For example, the mode change analyzing device 100 may correct a mode shape vector to correct the mode shape changed due to the structural stiffness reinforcing, and may calculate the modal assurance criterion (MAC) using the corrected mode shape vector.

The vibration exciter 120 sets an excitation pattern under control, and applies a physical force to one side of the specimen 110 according to the set excitation pattern. In one embodiment, the vibration exciter 120 may apply the physical force to a predetermined position of the specimen 110.

The specimen 110 may refer to a material to be analyzed, and may include a unidirectional composite material. In one embodiment, the specimen 110 may include a unidirectional carbon-based composite structure (UCBC) with structural stiffness reinforced in a direction corresponding to a single angle θ.

The vibration exciter 120 may employ a fixed impact device capable of automatically applying an impact to the specimen 110. In one embodiment, the vibration exciter 120 may include an impact hammer or an electrodynamic shaker. Hereinafter, for convenience of description, a case in which the impact hammer is used as the vibration exciter will be described. The impact hammer does not cause physical damage to the specimen 110, does not require pre-processing for testing, and may apply impact to the specimen 110 over a wide frequency range. The impact hammer may have a tip as a portion (impact portion) that actually applies the vibration.

The sensor 130 comes into contact with a predetermined position of the specimen 110 and collects a signal generated from the specimen 110 under the physical force applied from the vibration exciter 120. In one embodiment, the sensor 130 may be disposed at at least one or more sensing locations of the specimen 110. A type of the sensor 130 may vary depending on a type of a physical signal to be collected. For example, an acceleration sensor may be used for measuring acceleration vibration. A laser sensor may be used to measure surface velocity. A photogrammetry or string pots may be used to measure displacement. Hereinafter, for convenience of description, a description will be made on the assumption that the acceleration sensor is used as the sensor 130 to collect a vibration signal.

The mode change analyzer 140 calculates a frequency response based on the physical force applied to the specimen 110 and the vibration signal measured at a sensed position, and performs modal analysis based on the calculated frequency response, and calculates a mode shape vector of the specimen 110 based on the analysis result. The mode change analyzer 140 may correct the calculated mode shape vector and calculate the modal assurance criterion (MAC) using the corrected mode shape vector.

The mode change analyzer 140 includes the modal analyzer 142, the modified mode shape vector calculator 144, the first modal assurance criterion calculator 146, and the second modal assurance criterion calculator 148.

The modal analyzer 142 performs the modal analysis on the frequency response at a collection position based on the physical force applied to the specimen 110 and the vibration signal measured through the sensor 130 installed on the specimen 110. In one embodiment, the modal analyzer 142 may obtain a modal parameter (including a resonance frequency based on each of N modes (mode shapes), and a modal damping coefficient based on each resonance frequency) of the specimen 110 through modal analysis.

The modified mode shape vector calculator 144 corrects the mode shape vector calculated by the modal analyzer 142 so as to compensate for the mode shape change, thereby calculating the modified mode shape vector.

The first modal assurance criterion calculator 146 calculates a first modal assurance criterion (MAC) of the specimen 110 using the modified mode shape vector calculated by the modified mode shape vector calculator 144. In one embodiment, the first modal assurance criterion calculator 146 may calculate the first modal assurance criterion between the modified mode shape vector of the specimen 110 and a mode shape vector of an isotropic material, based on the modified mode shape vector of the specimen 110 and the mode shape vector of the isotropic material.

The second modal assurance criterion calculator 148 calculates a second modal assurance criterion (MAC) of the specimen 110 using the mode shape vector calculated by the modal analyzer 142. In one embodiment, the second modal assurance criterion calculator 148 may calculate the second modal assurance criterion between the mode shape vector of the specimen 110 and the mode shape vector of the isotropic material, based on the mode shape vector of the specimen 110 and the mode shape vector of the isotropic material.

In one embodiment, the mode change analyzer 140 may output the calculated first modal assurance criterion (MAC) and the calculated second modal assurance criterion (MAC) on a screen. In one embodiment, the mode change analyzer 140 may compare each of the calculated first modal assurance criterion (MAC) and the calculated second modal assurance criterion (MAC) with a preset reference, and output a comparison result on a screen.

Figure 2:
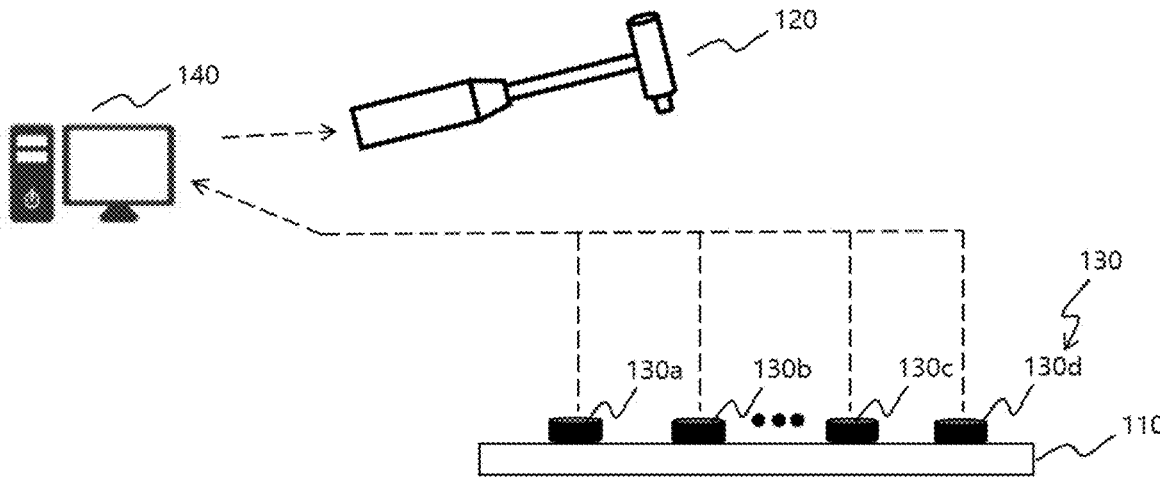
FIG. 2 is a configuration diagram showing a configuration of a device for analyzing mode change of a unidirectional composite material including a plurality of sensors by way of example.

FIG. 2 is a configuration diagram showing a configuration of a device for analyzing mode change of a unidirectional composite material including a plurality of sensors by way of example. Hereinafter, for the convenience of description, following description will be based on differences thereof from those of FIG. 1.

Referring to FIG. 2, a plurality of sensors 130a, 130b, 130c, 130d, . . . may be located on one side of the specimen 110. The configuration except for a configuration that the vibration of the specimen 110 is collected using a plurality of sensors 130a, 130b, 130c, 130d, . . . , is the same as that in FIG. 1. The number and locations of the sensors may vary depending on implementations.

The positions of the plurality of sensors 130a, 130b, 130c, 130d, . . . may be preset or may be determined by a user. Each of the plurality of sensors 130a, 130b, 130c, 130d, . . . collects the vibration of the specimen 110 at a corresponding position and transmits the collected vibration to the mode change analyzer 140.

Hereinafter, referring to FIG. 1 to FIG. 13, a process of analyzing the change in the mode of the carbon-based composite material in which the structural stiffness is reinforced in a single direction using the mode change analyzing device 100 will be described based on a specific example.

The vibration exciter 120 sets an excitation pattern under control, and applies a physical force to one side of the specimen 110 according to the set excitation pattern. For example, the vibration exciter 120 may apply the physical force to a predetermined position of the specimen 110. The sensor 130 comes into contact with a predetermined position of the specimen 110 and collects a signal generated from the specimen 110 under the physical force applied from the vibration exciter 120. In one embodiment, the specimen 110 may include a unidirectional carbon-based composite structure (UCBC) in which carbon fibers are oriented at the θ angle relative to a reference line, and thus the structural stiffness is reinforced in a direction corresponding to the angle θ. In one embodiment, the specimen 110 may be a unidirectional carbon-based composite structure whose the structural stiffness is reinforced in a direction corresponding to the angle θ of one of 0, 30, 45, 60, and 90 degrees.

Figure 3:
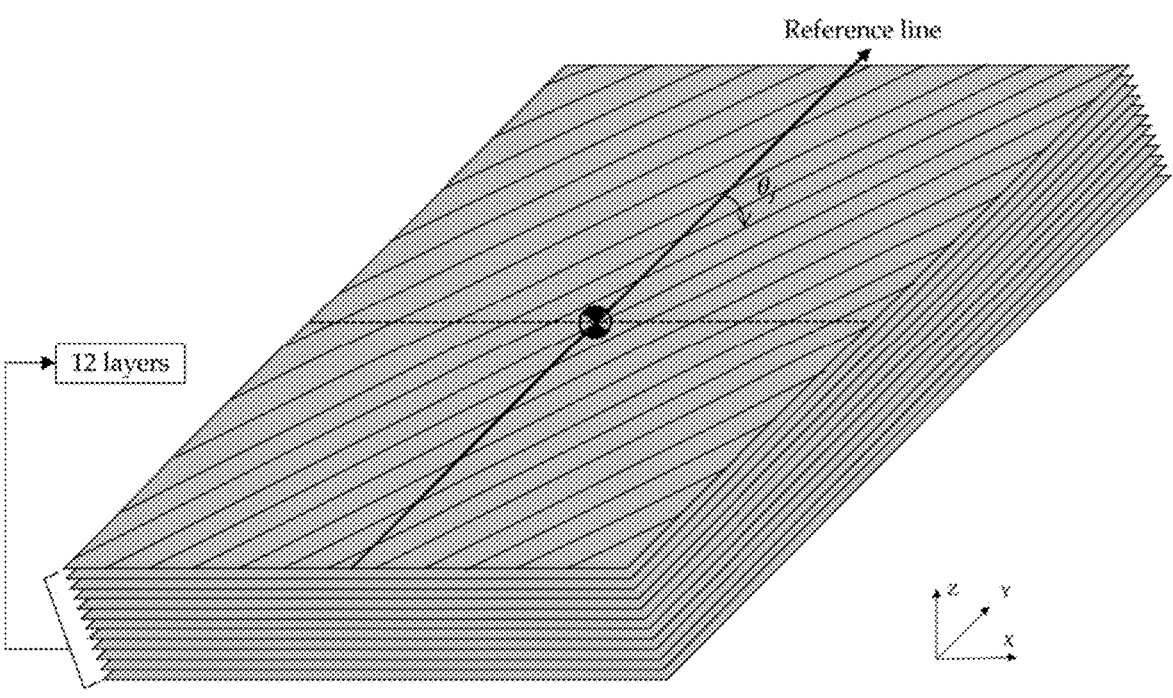
FIG. 3 is a diagram showing an example of a unidirectional carbon fiber-based composite (UCBC) structure (UCBC) in which a carbon fiber is oriented in a $\theta$ angle and the structural stiffness is reinforced in a direction corresponding to the angle $\theta$.

FIG. 3 is a diagram showing an example of a unidirectional carbon fiber-based composite (UCBC) in which the carbon fiber is oriented in a direction corresponding to the angle θ and thus the structural stiffness is reinforced in the direction corresponding to the angle 0.

Referring to FIG. 3, it may be identified that the unidirectional carbon fiber-based composite (UCBC) has carbon fibers oriented at the 0 angle relative to the reference line. In one embodiment, the reference line may be defined as a line passing through a central point of the specimen and extending along a Y-axis.

In one embodiment, the unidirectional carbon fiber-based composite (UCBC) may have a rectangular parallelepiped shape having a size of 80 mm (W)×150 mm (L)×3 mm (H) in which the carbon fibers are oriented at the θ angle. In one embodiment, the unidirectional carbon-based composite was produced by stacking 12 layers made of USN 250A material (SK Chemical) in the same direction and performing autoclave curing of the stack. The fabricated 12-layer unidirectional carbon-based composite structure may be cut so that an orientation of the carbon fiber is 0°, 30°, 45°, 60° or 90°, and the cut material may be used as the specimen 110.

Figure 4:
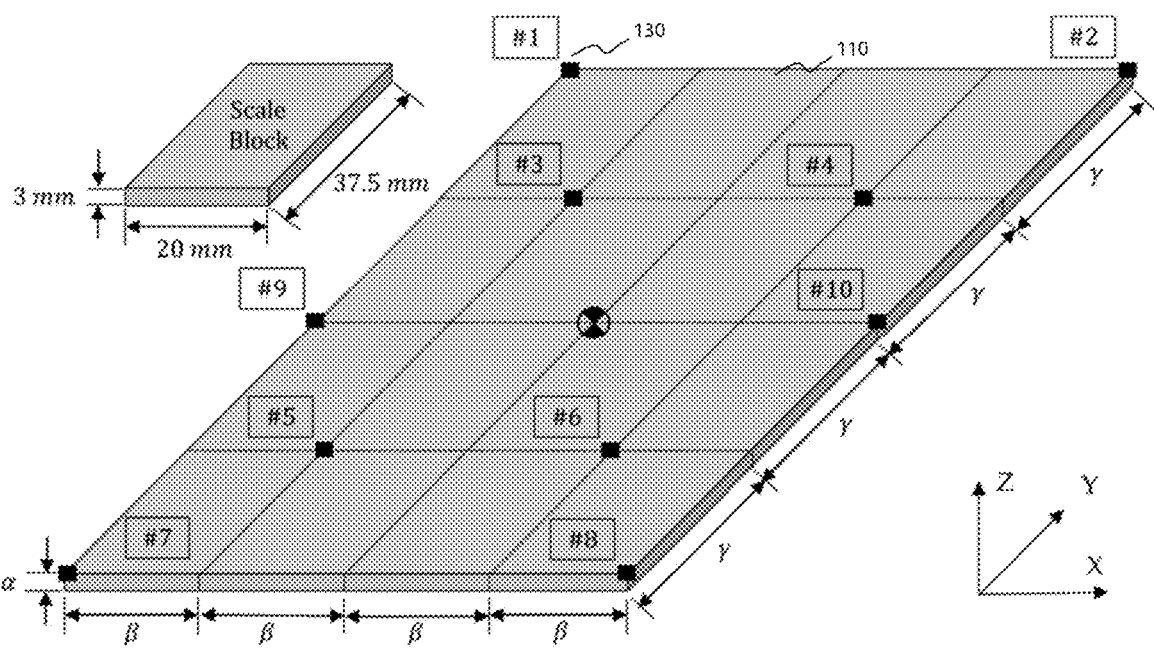
FIG. 4 is a diagram showing an example of a unidirectional composite material specimen and a sensor attachment position.
Figure 5:
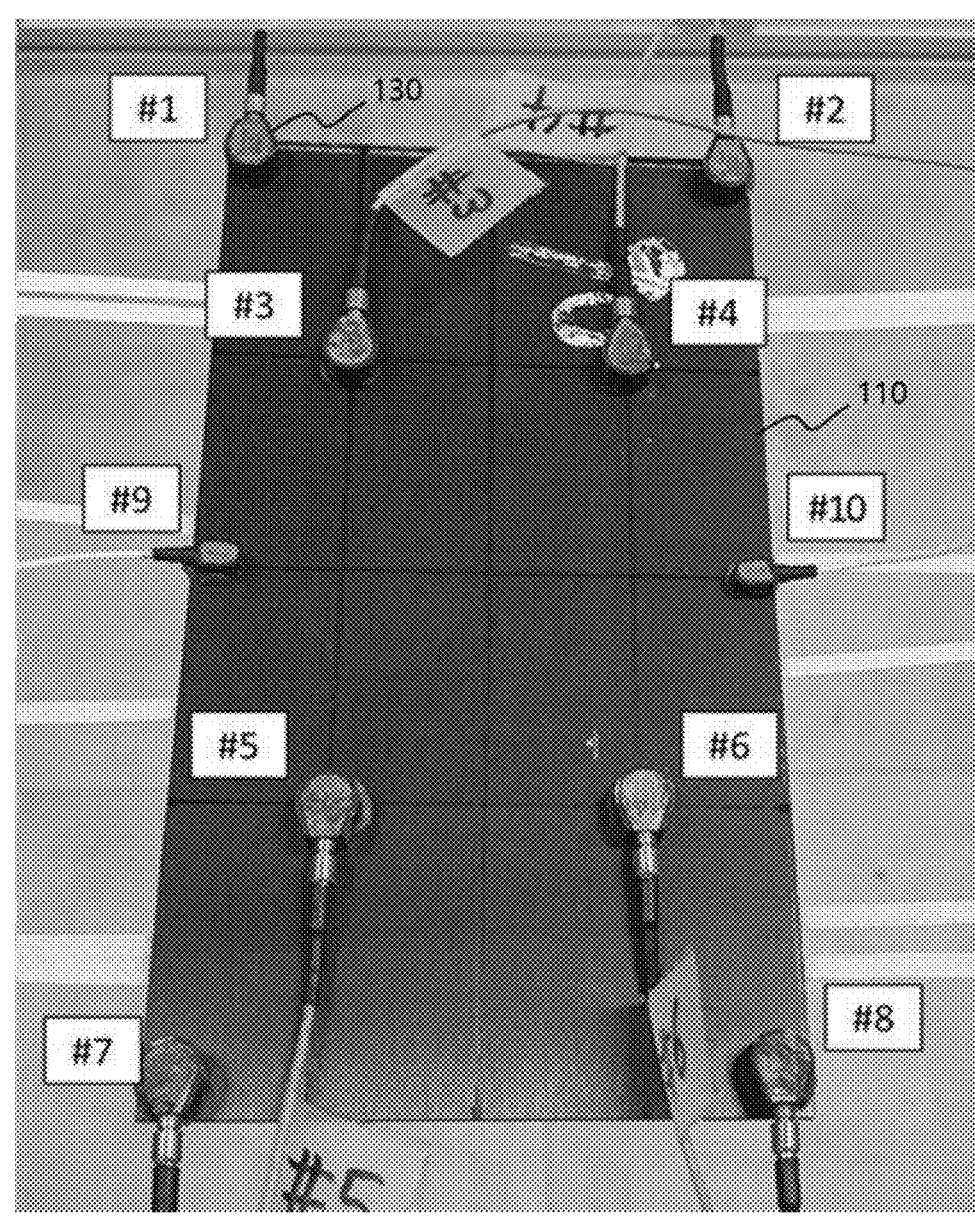
FIG. 5 is a diagram showing an example of a composite material specimen to which a plurality of sensors are attached.

FIG. 4 is a diagram showing an example of a unidirectional composite material specimen and sensor attachment positions, and FIG. 5 is a diagram showing an example of a composite material specimen to which a plurality of sensors are attached.

Referring to FIG. 4 and FIG. 5, acceleration sensors 130 may be respectively attached to 10 locations (#1, #2, #3, #4, #5, #6, #7, #8, #9, #10) on one side of the specimen 110. The number and the attachment locations of the acceleration sensors 130 may vary depending on implementation examples. In one embodiment, and the sensors may be uniformly disposed on one side of the specimen 110 such that the sensors may be spaced apart from each other by a regular spacing. In one embodiment, the specimen 110 having a size of 20 mm (W)×37.5 mm (L)×3 mm (H) may be used for mode change analysis.

Referring back to FIG. 1, the vibration exciter 120 applies a physical force in a −Z-axis direction to the location #3 under control, and each of the sensors 130 respectively positioned at the locations #1 to #10 collects a vibration signal in a short axis (+Z) direction and transmits the collected signal to the mode change analyzer 140.

The modal analyzer 142 performs the modal analysis of the frequency response ft each sensed position based on the physical force applied to the specimen 110 and the vibration signal collected from the sensor 130, and calculates at least one mode shape vector of the specimen 110 based on the analysis result. In this regard, the modal analysis refers to analyzing the natural frequency of a vibration problem.

In one embodiment, assuming that the specimen 110 is a linear time-invariant system, dynamic behavior of the specimen 110 may be expressed as a modal parameter. An n-degree-of-freedom governing equation of the linear time-invariant system may be expressed as a following Equation 1:

$$M\ddot{X}(t)+C\dot{X}(t)+KX(t)=[0 \ldots 0]^T$$

$$X(t)=[x_1(t)+ \ldots x_n(t)]^T. \qquad \text{[Equation 1]}$$

where M represents a mass matrix, C represents a damping matrix, K represents a stiffness matrix, and $[A]^T$ represents a transpose matrix of a matrix A.

The Equation 1 of a time domain may be expressed as a following Equation 2 of a frequency domain:

$$X(t) = \Phi R \qquad \text{[Equation 2]}$$

$$\begin{bmatrix} 1 & & \text{zeros} \\ & \ddots & \\ \text{zeros} & & 1 \end{bmatrix} \ddot{R} + \begin{bmatrix} 2\omega_{n,1}\xi_1 & & \text{zeros} \\ & \ddots & \\ \text{zeros} & & 2\omega_{n,N}\xi_N \end{bmatrix} \dot{R} +$$

$$\begin{bmatrix} \omega_1^2 & & \text{zeros} \\ & \ddots & \\ \text{zeros} & & \omega_N^2 \end{bmatrix} R = \begin{bmatrix} 0 \\ \vdots \\ 0 \end{bmatrix}$$

$$R = [\, r_1(t) \quad \ldots \quad r_N(t)\,]^T$$

where $\omega_{n,i}$ represents a resonance frequency of an i-th mode, $\xi_i$ represents a modal damping ratio of the i-th mode, and i represents a natural number.

$\varphi_i$ denotes a mode shape vector whose a mass is normalized, and $\Phi(=[\varphi_1 \ldots \varphi_n])$ denotes a matrix including the mode shape vector.

A viscous damping coefficient $c_i$ of the i-th mode may be expressed as a following Equation 3, and the structural stiffness $k_i$ of the i-th mode may be expressed as a following Equation 4:

$$c_i=2\omega_{n,i}\xi_i \qquad \text{[Equation 3]}$$

$$k_i=m_i(\omega_{n,i})^2 \qquad \text{[Equation 4]}$$

where $m_i$ represents a modal mass of the i-th mode.

Due to the characteristics of the linear system, a frequency response function (FRF) of the i-th mode between two points (a point m and a point n) in which an input point and an output point are different from each other may be expressed as a following Equation 5:

$$H_{mn}^i(\omega) = \frac{r_{mn}^i}{(\omega_{n,i})^2 - \omega^2 + 2\omega_{n,i}\omega\xi_{n,i}j} \qquad \text{[Equation 5]}$$

where $\omega$ denotes a frequency, $r_{mn}^i$ denotes a residual of the i-th mode, and j denotes an imaginary unit.

The resonance frequency may be measured at each of repeated peak points excluding a nodal point of the frequency response function. The modal damping coefficient may be calculated using a value between the resonance frequency and a half power point. The modal damping ratio $\xi_{n,i}$ of the i-th mode may be calculated using a following Equation 6:

$$\xi_{n,i} = \frac{\omega_{n,i}}{2|\omega_{n,i}^{(2)} - \omega_{n,i}^{(1)}|} \qquad \text{[Equation 6]}$$

where $|a|$ denotes an absolute value of a, and $\omega_{n,i}^{(2)}$ and $\omega_{n,i}^{(1)}$ represent the half-power point of the resonant frequency $\omega_{n,i}$.

In one embodiment, when the specimen 110 is the unidirectional carbon-based composite structure in which carbon fibers are oriented at the angle θ and thus the structural stiffness is reinforced in a direction of the angle θ, the unidirectional carbon-based composite structure whose the structural stiffness is reinforced may also be assumed to be a linear system.

The modal parameter of the unidirectional carbon-based composite structure is affected by a temperature, a vibration excitation pattern (impact, random, harmonic) and the orientation of the carbon fibers. When the temperature condition and the vibration excitation pattern are kept constant, the modal parameter of the unidirectional carbon-based composite structure is affected by the orientation of the carbon fiber, that is, the angle θ at which the carbon fibers are oriented, and thus, the modal parameter may be expressed as a function of the angle 0.

In this case, the frequency response function (FRF) of the i-th mode of the unidirectional carbon-based composite structure in which the structural stiffness is reinforced in a direction of the angle θ may be expressed as a following Equation 7:

$$H_{mn}^i(\omega, \theta) = \frac{r_{mn}^i}{(\omega_{n,i}(\theta))^2 - \omega^2 + 2\omega\omega_{n,i}(\theta)\xi_{n,i}(\theta)j} \qquad \text{[Equation 7]}$$

Figures 6, 7:
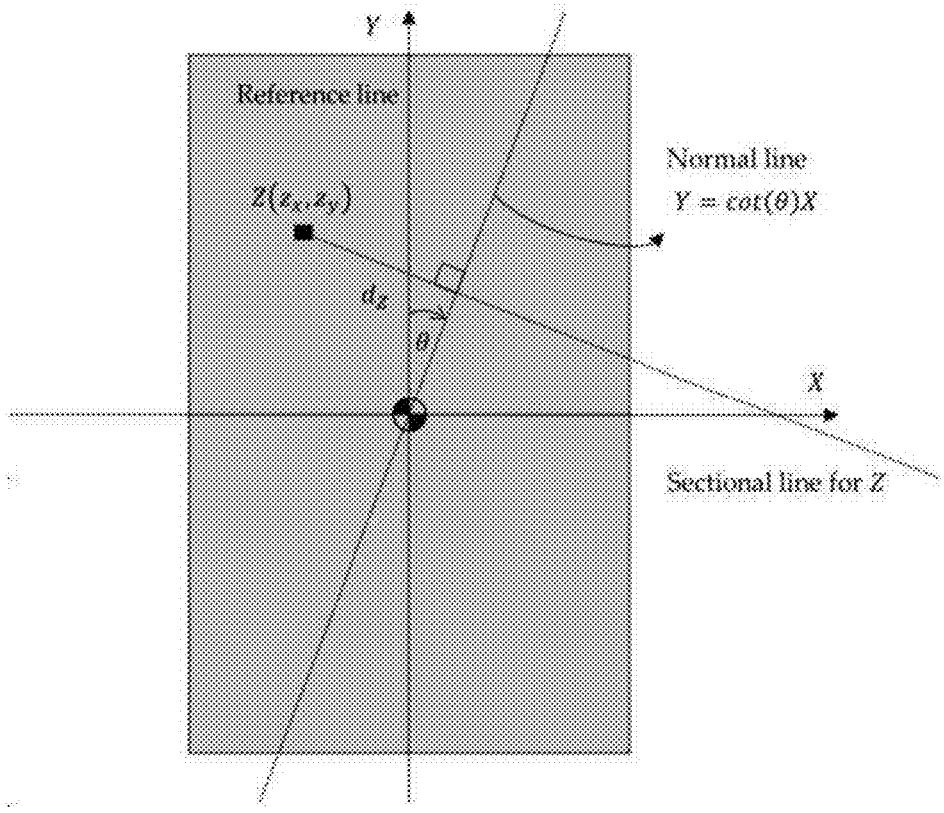
FIG. 6 is a diagram showing an example of a mode shape vector calculated on a specimen.
FIG. 7 is a diagram showing a distance between a measurement position $Z(z\_x, z\_y)$ and a normal line in an UCBC specimen in which the carbon fiber orientation is 0.

The modal analyzer 142 calculates at least one mode shape vector using the frequency response function of the Equation 7. FIG. 6 is a diagram showing an example of the mode shape vector calculated on the specimen through an experiment.

The second modal assurance criterion calculator 148 calculates the second modal assurance criterion (MAC) of the specimen 110 using two different mode shape vectors among the mode shape vectors calculated by the modal analyzer 142. For example, the second modal assurance criterion calculator 148 may calculate the second modal assurance criterion (MAC) using a following Equation 8, based on an i-th mode shape vector $\varphi_i$ and an j-th mode shape vector $\varphi_j$ as calculated by the modal analyzer 142. In this regard, the modal assurance criterion (MAC) may indicate similarity between two mode shape vectors.

$$MAC(i, j) = \frac{\left|(\varphi_i)^T(\varphi_j)^*\right|^2}{\left((\varphi_i)^T(\varphi_i)^*\right)\left((\varphi_j)^T(\varphi_j)^*\right)}$$ [Equation 8]

where $(\varphi_i)^T$ denotes a transpose matrix of the i-th mode shape vector $\varphi_i$ and denotes $(\varphi_i)^*$ a conjugate matrix of the i-th mode shape vector $\varphi_i$. Further, $(\varphi_j)^T$ and represent $(\varphi_j)^*$ a transpose matrix and a conjugate matrix of the j-th mode shape vector $\varphi_j$, respectively.

In one embodiment, the second modal assurance criterion calculator 148 may calculate the second modal assurance criterion (MAC) between the mode shape vector of the specimen and the mode shape vector of the isotropic material, based on the mode shape vector calculated by the modal analyzer 142 and the mode shape vector of the isotropic material. In this case, in the Equation 8, $\varphi_i$ may correspond to the i-th mode shape vector calculated by the modal analyzer 142, while $\varphi_j$ may correspond to the mode shape vector of the isotropic material.

The modified mode shape vector calculator 144 may correct the mode shape vector calculated by the modal analyzer 142 so as to compensate for the mode shape change to calculate the modified mode shape vector. In one embodiment, the modified mode shape vector calculator 144 may correct the mode shape vector, based on a distance between the normal line passing through the center of the structure of the specimen 110 and the sensed position (the sensor position) so that the mode shape change is minimized, thereby calculating the modified mode shape vector. In this regard, the normal line may be a line inclined at $\theta$ angle relative to the reference line of the specimen 110, and may be defined as a line passing through the center of the structure of the specimen 110.

FIG. 7 is a diagram for illustrating a distance between a measurement position $Z(z_x,z_y)$ and the normal line in the UCBC specimen where the carbon fiber is oriented at the angle $\theta$.

When a horizontal line passing through a center of the structure of the specimen 110 as an origin is defined as an X-axis line and a vertical line passing through a center of the structure of the specimen 110 as an origin is defined as a Y-axis line, the normal line may be expressed as $Y=\cot(\theta)X$. When a position coordinate of a point on the specimen 110 is $(z_x, z_y)$ and a vertical distance from the position $(z_x, z_y)$ to the normal line is defined as $d_z$, $d_z$ may be expressed as a following Equation 9:

$$d_z(\theta) = \frac{\left|\cot(\theta)z_x - z_y\right|}{\sqrt{(\cot(\theta))^2 + 1}},$$ [Equation 9]

Figure 8:
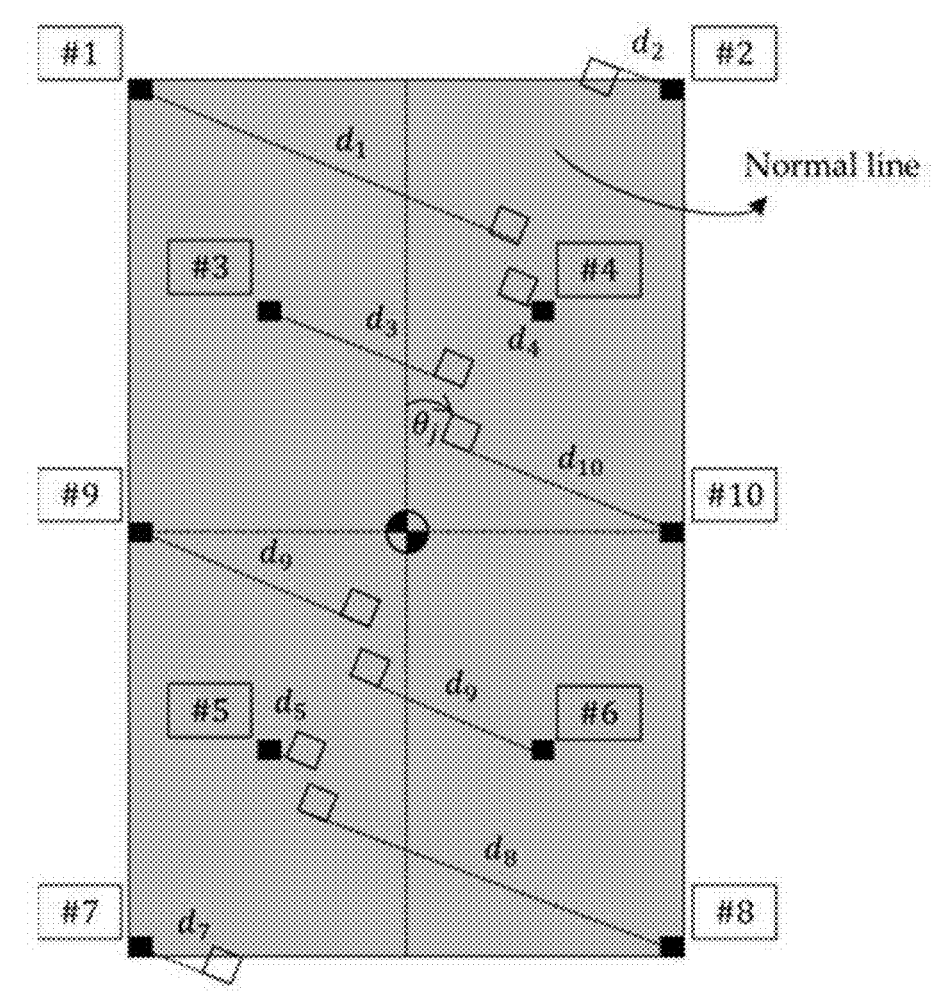
FIG. 8 is a diagram showing a distance between a normal line and a plurality of measurement locations on the UCBC specimen.

FIG. 8 is a diagram for illustrating a distance between the normal line and each of a plurality of sensed locations of the UCBC specimen.

In one embodiment, a distance from each sensed position to the normal line may be used to correct the mode shape vector to calculate the modified mode shape vector. Referring to FIG. 8, FIG. 8 shows a case where 10 sensors 130 are placed on the UCBC specimen 110 in which a carbon fiber is oriented at $\theta$ and there are 10 sensed positions. Each vertical distance $d_1$, $d_2$, $d_3$, $d_4$, $d_5$, $d_6$, $d_7$, $d_8$, $d_9$, and $d_{10}$ from each sensed location (#1, #2, #3, #4, #5, #6, #7, #8, #9, #10) to the normal line is shown.

The vertical distance from each sensed position where the sensor 130 is disposed on the specimen 110 to the normal line may be expressed based on a following Equation 10 which may be defined as a distance vector.

$$D(\theta)=[d_1(\theta)d_2(\theta) \ldots d_{N-1}(\theta) \, d_N(\theta)]$$ [Equation 10]

where N represents the number of the sensed locations.

In one embodiment, the vertical distance from each sensed position where the sensor 130 is disposed to the normal line may be pre-calculated by the user and then may be input into the modified mode shape vector calculator 144. In another embodiment, the modified mode shape vector calculator 144 may receive the structural stiffness reinforcing angle $\theta$, the number of sensors, and sensor position information and may automatically calculate the vertical distance from each sensed position to the normal line, based on the structural stiffness reinforcing angle $\theta$, the number of sensors, and sensor position information. In still another embodiment, the modified mode shape vector calculator 144 may analyze an image of the photographed specimen 110 to analyze the angle $\theta$ at which the carbon fiber is oriented, the center point of the specimen, the number of sensors, and the location information of the sensors, and then may automatically calculate the vertical distance from each sensed position to the normal line, based on the angle $\theta$ at which the carbon fiber is oriented, the center point of the specimen, the number of sensors, and the location information of the sensors. The modified mode shape vector calculator 144 may calculate the distance vector of the above Equation 10 based on the calculated distance.

In the composite material whose the structural stiffness is reinforced at the angle $\theta$, distortion occurs in the mode shape vector, and the structural stiffness increases according to the $\theta$ at which the carbon fiber is oriented. A radius of curvature decreases in a deflected structure due to increased structural stiffness. Therefore, to compare the mode shape vectors of the material reinforced in different angles with each other, the mode shape vector must be modified.

A following Equation 11 refers to a modification window for modifying the mode shape vector of the composite material in which carbon fibers are oriented in the $\theta$ angle direction and thus the structural stiffness is reinforced in the direction of the angle $\theta$:

$$\hat{W}(\theta) = \frac{D(\theta)}{\max(D(\theta))}$$ [Equation 11]

where max(A) represents a maximum value in A. The modification window $\hat{W}(\theta)$ refers to a result obtained by dividing a distance vector representing a distance from each sensed position to the normal line by the maximum distance value, and may be defined as a normalized distance vector.

The modified mode shape vector calculator 144 compensates the mode shape vector calculated by the modal analyzer 142 using the modification window $\hat{W}(\theta)$ to calculate the modified mode shape vector. For example, in compensating the j-th mode shape vector $\varphi_j$ using the modification window $\hat{W}(\theta)$, the modified mode shape vector $\varphi_j^m$ may be expressed as a following Equation 12:

$$\varphi_j^m=((\varphi_j)^T \cdot \mathrm{diag}(\hat{W}))^T$$ [Equation 12]

where diag(A) represents a diagonal matrix of the matrix A.

Figures 9, 10:
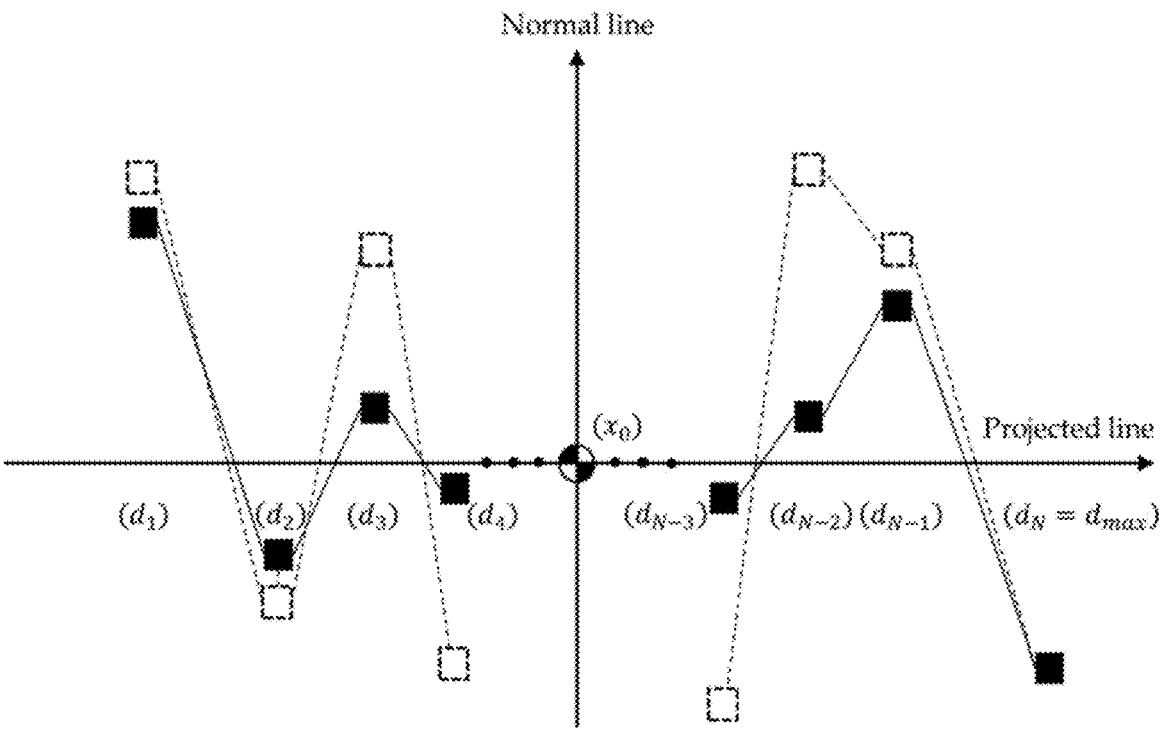
FIG. 9 is a diagram showing a mode shape vector before modification and a mode shape vector after modification as calculated via modal analysis
FIG. 10 is a table showing a modal parameter on an isotropic specimen.

FIG. 9 shows a mode shape vector before modification and a mode shape vector after modification as calculated through modal analysis.

Referring to FIG. 9, $d_N$ is assumed as the maximum distance value. It may be identified that when comparing the mode shape vector after modification with the mode shape vector before modification, as the position is closer to a center point $x_0$, the mode shape vector decreases greatly. Therefore, when the modification window is applied to the mode shape vector before modification, the application result is that the radius of curvature of the modified mode shape vector is emphasized.

Referring back to FIG. 1, the first modal assurance criterion calculator 146 may calculate the first modal assurance criterion (MAC) of the specimen 110, using two different modified mode shape vectors among the modified mode shape vectors calculated by the modified mode shape vector calculator 144. For example, the first modal assurance criterion calculator 146 may calculate the first modal assurance criterion (MAC) using the following Equation 13, based on the i-th modified mode shape vector $\varphi_i^m$ and the j-th modified mode shape vector $\varphi_j^m$ as calculated by the modified mode shape vector calculator 144. In this regard, the modal assurance criterion MAC may indicate the similarity between both modified mode shape vectors.

$$MAC(i, j) = \frac{\left|(\varphi_i^m)^T(\varphi_j^m)^*\right|^2}{\left((\varphi_i^m)^T(\varphi_i^m)^*\right)\left((\varphi_j^m)^T(\varphi_j^m)^*\right)} \qquad \text{[Equation 13]}$$

where $(\varphi_i^m)^T$ denotes a transpose matrix of the i-th modified mode shape $\varphi_i^m$, and $(\varphi_i^m)^*$ denotes a conjugate matrix of the i-th modified mode shape $\varphi_i^m$. Further, $(\varphi_j^m)^T$ and $(\varphi_j^m)^*$ represent a transpose matrix and a conjugate matrix of the j-th mode shape $\varphi_j^m$, respectively.

In one embodiment, the first modal assurance criterion calculator 146 may calculate the first modal assurance criterion (MAC) between the modified mode shape vector of the specimen 110 and the mode shape vector of the isotropic material, based on the modified mode shape vector calculated by the modified mode shape vector calculator 144 and the mode shape vector of the isotropic material. In this case, in the above Equation 13, $\varphi_i^m$ may correspond to the i-th modified mode shape vector as calculated by the modified mode shape vector calculator 144, while $\varphi_j^m$ may correspond to the mode shape vector of the isotropic material. Using the modified mode shape vector of the unidirectional composite material specimen and the mode shape vector of the isotropic material, the device may evaluate the similarity between the mode shape vector the material whose the stiffness is reinforced in a specific direction and that of the material whose the stiffness is not reinforced, using the modal assurance criterion (MAC).

FIG. 10 is a table showing the modal parameters of the isotropic specimen, and FIG. 11 is a table showing the modal parameter and the modal assurance criterion (MAC) calculated on the UCBC specimen.

FIG. 10 is a table showing the modal parameters of first five modes calculated by performing modal analysis on the isotropic specimen.

Referring to FIG. 11, FIG. 11 is a table showing the modal parameter and the modal assurance criterion (MAC) calculated on each specimen of the unidirectional carbon-based composite structure (UCBC) whose the structural stiffness is reinforced at each of 0, 30, 45, 60, and 90 degrees. The values listed in the table in FIG. 11 represent the modal parameter and the modal assurance criterion (MAC) calculated on the first five mode shape vectors of each specimen. The modal assurance criterion is the result of calculating the MAC value of the mode shape vector of the isotropic specimen in FIG. 10 and that of the unidirectional carbon-based composite structure (UCBC) specimen in FIG. 11.

FIG. 12 is a table showing the modal assurance criterion (MAC) of the mode shape vector before modification and the modal assurance criterion (MAC) of the modified mode shape vector on the UCBC specimen.

Referring to FIG. 12, based on a comparing result of the modal assurance criteria, it may be identified that the modal assurance criterion (MAC) using the modified mode shape vector has a higher value than the modal assurance criterion (MAC) using the original mode shape vector (the model shape vector before modification). This is because the modified mode shape vector minimizes the effect of the mode shape vector changing in a state in which the stiffness is reinforced in a specific direction such that the similarity between the mode shape thereof and the mode shape of the isotropic specimen is increased. Therefore, in using the method for analyzing the mode change according to the present disclosure, the similarity between the mode shape vector of the composite material whose the stiffness is reinforced in a specific direction and that of a material in which the stiffness is not reinforced may be evaluated using the modal assurance criterion (MAC). Thus, excellent results may be obtained in identifying the mode shape parameter of the same order.

Figure 14:
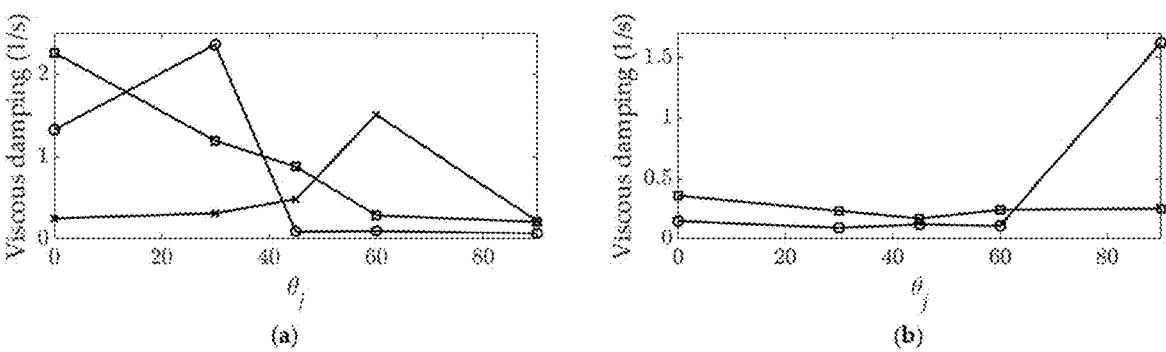
FIG. 14 is a diagram showing change in a viscous modal damping coefficient of the UCBC specimen.

FIG. 13 is a diagram showing the change in the structural stiffness of the UCBC specimen, and FIG. 14 is a diagram showing the change in the viscous modal damping coefficient of the UCBC specimen.

FIG. 13 and FIG. 14 show the results of tracking how the modal parameter value of the unidirectional carbon-based composite structure (UCBC) specimen changes using the modified mode shape vector according to the present disclosure. Using the method and the device according to the present disclosure, reliable tracking of a mode of interest may be performed using only the modal assurance criterion (MAC).

Figure 15:
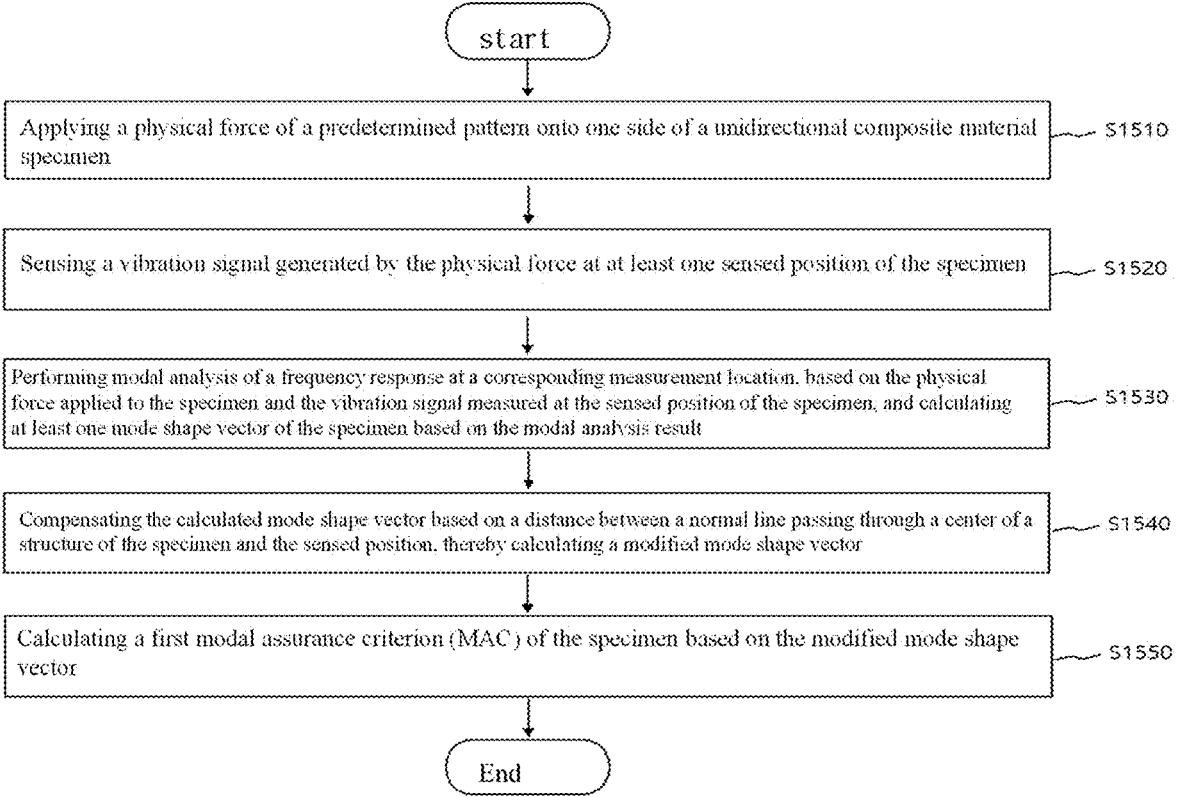
FIG. 15 is a flow chart for illustrating a method for analyzing mode change of a unidirectional composite material according to an embodiment of the present disclosure.

FIG. 15 is a flowchart for illustrating a method for analyzing the mode change of the unidirectional composite material according to an embodiment of the present disclosure.

Referring to FIG. 15, the device 100 for analyzing the mode change of the unidirectional composite material may apply the physical force of a predetermined pattern onto one side of the unidirectional composite material specimen using the vibration exciter 120 in S1510. The device may sense the vibration signal generated from the physical force at the at least one sensed position of the specimen using the sensor 130 in S1520.

The modal analyzer 142 may perform modal analysis of the frequency response at the corresponding collection location based on the physical force applied to the specimen and the vibration signal measured at the sensed location of the material specimen and may calculates at least one mode shape vector of the material specimen based on the modal analysis result in S1530.

The modified mode shape vector calculator 144 may compensate the obtained mode shape vector based on the distance between the normal line passing through the center of the structure of the specimen and the detected position to calculate the modified mode shape vector in S1540. The first modal assurance criterion calculator 146 calculates the first modal assurance criterion (MAC) of the specimen using the modified mode shape vector in S1550.

The second modal assurance criterion calculator 148 calculates the second modal assurance criterion of the specimen based on the mode shape vector calculated by the modal analyzer 142.

The descriptions about acquiring the modal parameter via the modal analysis of the specimen, calculating the modified mode shape vector, and obtaining each modal assurance criterion are the same as described in FIG. 1 to FIG. 9 above.

The method and the device for analyzing the mode change of the unidirectional composite material as described above with reference to FIG. 1 to FIG. 15 may be implemented in a form of a recording medium including instructions executable by a computer such as an application or a module executed by the computer.

Although the present disclosure has been described with reference to the embodiment of the present disclosure, the technical idea of the present disclosure is not limited to the above embodiment. The method and the device for analyzing the mode change of each of the unidirectional composite material may be modified in various manner within the scope not departing from the technical idea of the present disclosure.

What is claimed is:

1. A method for analyzing change in a mode of a unidirectional composite material, the method comprising:

applying a physical force of a predetermined pattern onto one side of a unidirectional composite material specimen;

sensing a vibration signal generated by the physical force at at least one sensed position of the specimen;

performing modal analysis of a frequency response at a corresponding measurement location, based on the physical force applied to the specimen and the vibration signal measured at the sensed position of the specimen, and calculating at least one mode shape vector of the specimen based on the modal analysis result;

compensating the calculated mode shape vector based on a distance between a normal line passing through a center of a structure of the specimen and the sensed position, thereby calculating a modified mode shape vector; and calculating a first modal assurance criterion (MAC) of the specimen based on the modified mode shape vector, wherein performing the modal analysis of the frequency response includes calculating a frequency response function using a following Equation 1 based on the physical force applied to the specimen and the vibration signal measured at the sensed position of the specimen:

$$H_{mn}^i(\omega, \theta) = \frac{r_{mn}^i}{(\omega_{n,i}(\theta))^2 - \omega^2 + 2\omega\omega_{n,i}(\theta)\xi_{n,i}(\theta)j} \quad \text{[Equation 1]}$$

where $\omega_{n,i}$ denotes a resonance frequency of an i-th mode, $\xi_i$ denotes a modal damping ratio of the i-th mode, i is a natural number, $\theta$ denotes the angle, $\omega$ denotes the frequency, $r_{mn}^i$ denotes a residual of the i-th mode, and j denotes an imaginary unit.

2. The method of claim 1, wherein the specimen includes a unidirectional carbon-based composite structure (UCBC) whose structural stiffness is reinforced in a single direction of an angle $\theta$.

18

3. The method of claim 2, wherein the specimen includes the unidirectional carbon-based composite structure (UCBC) whose structural stiffness is reinforced in a single direction of one of 0 degree, 30 degrees, 45 degrees, 60 degrees and 90 degrees.

4. The method of claim 1, further comprising calculating a second modal assurance criterion of the specimen using a following Equation 6 based on the mode shape vector calculated via the modal analysis of the frequency response:

$$MAC(i, j) = \frac{\left|(\varphi_i)^T(\varphi_j)^*\right|^2}{\left((\varphi_i)^T(\varphi_i)^*\right)\left((\varphi_j)^T(\varphi_j)^*\right)} \quad \text{[Equation 6]}$$

where $(\varphi_i)^T$ denotes a transpose matrix of an i-th mode shape vector $\varphi_i$ and $(\varphi_i)^*$ denotes a conjugate matrix of the i-th mode shape vector $\Phi_i$, and $(\varphi_j)^T$ and $(\varphi_j)^*$ represent a transpose matrix and a conjugate matrix of a j-th mode shape vector $\varphi_j$, respectively.

5. The method of claim 4, wherein calculating the second modal assurance criterion of the specimen includes calculating the second modal assurance criterion between the mode shape vector of the specimen and a mode shape vector of an isotropic material, based on the mode shape vector of the specimen and the mode shape vector of the isotropic material.

6. A method for analyzing change in a mode of a unidirectional composite material, the method comprising:

applying a physical force of a predetermined pattern onto one side of a unidirectional composite material specimen;

sensing a vibration signal generated by the physical force at least one sensed position of the specimen;

performing modal analysis of a frequency response at a corresponding measurement location, based on the physical force applied to the specimen and the vibration signal measured at the sensed position of the specimen, and calculating at least one mode shape vector of the specimen based on the modal analysis result;

compensating the calculated mode shape vector based on a distance between a normal line passing through a center of a structure of the specimen and the sensed position, thereby calculating a modified mode shape vector; and calculating a first modal assurance criterion (MAC) of the specimen based on the modified mode shape vector, wherein calculating the modified mode shape vector includes:

calculating a distance vector of a following Equation 2 based on the distance between the at least one sensed position and the normal line; and calculating a normalized distance vector using a following Equation 3:

$$d_z(\theta) = \frac{\left|\cot(\theta)z_x - z_y\right|}{\sqrt{(\cot(\theta))^2 + 1}}, \quad \text{[Equation 2]}$$

$$D(\theta) = [\, d_1(\theta) \quad d_2(\theta) \quad \dots \quad d_{N-1}(\theta) \quad d_N(\theta) \,]$$

where $Z(z_x, z_y)$ denotes a coordinate of the sensed position, $d_z$ denotes the distance between the normal line and the sensed position Z, and $D(\theta)$ denotes the distance vector, $$\hat{W}(\theta) = \frac{D(\theta)}{\max(D(\theta))} \qquad \text{[Equation 3]}$$

where $W(\theta)$ denotes the normalized distance vector.

7. The method of claim 6, wherein calculating the modified mode shape vector includes calculating the modified mode shape vector using a following Equation 4 based on the normalized distance vector:

$$\varphi_j{}^m = ((\varphi_j)^T \cdot \text{diag}(\hat{W}))^T \qquad \text{[Equation 4]}$$

where $(\varphi_j)^T$ denotes a transpose vector of the mode shape vector, $\varphi_j$, and diag(A) denotes a diagonal matrix of a matrix A.

8. The method of claim 7, wherein calculating the first modal assurance criterion of the specimen using the modified mode shape vector includes calculating the first modal assurance criterion using a following Equation 5:

$$MAC(i, j) = \frac{\left|(\varphi_i{}^m)^T(\varphi_j{}^m)^*\right|^2}{\left((\varphi_i{}^m)^T(\varphi_i{}^m)^*\right)\left((\varphi_j{}^m)^T(\varphi_j{}^m)^*\right)} \qquad \text{[Equation 5]}$$

where $(\varphi_i{}^m)^T$ denotes a transpose matrix of an i-th modified mode shape $\varphi_i{}^m$, and $(\varphi_i{}^m)^*$ denotes a conjugate matrix of the i-th modified mode shape $\varphi_i{}^m$, and $(\varphi_j{}^m)^T$ and $(\varphi_j{}^m)^*$ represent a transpose matrix and a conjugate matrix of a j-th mode shape $\varphi_j{}^m$, respectively.

9. The method of claim 8, wherein calculating the first modal assurance criterion of the specimen using the modified mode shape vector includes calculating the first modal assurance criterion between the modified mode shape vector of the specimen and a mode shape vector of an isotropic material, based on the modified mode shape vector of the specimen and the mode shape vector of the isotropic material.

10. A device for analyzing change in a mode of a unidirectional composite material, the device comprising:

a vibration exciter configured to set a vibration excitation pattern under control, and apply a physical force to one side of a unidirectional composite material specimen according to the set vibration excitation pattern;

a sensor for measuring a vibration signal generated at the specimen due to the physical force at least one sensed position of the specimen;

a modal analyzer for performing modal analysis on a frequency response at a corresponding measurement position based on the physical force applied to the specimen and the vibration signal measured at the sensed position of the specimen, and calculating at least one mode shape vector of the specimen based on the modal analysis result;

a modified mode shape vector calculator for compensating the mode shape vector calculated by the modal analyzer to calculate a modified mode shape vector; and a first modal assurance criterion calculator for calculating a first modal assurance criterion (MAC) based on the calculated modified mode shape vector, wherein the modified mode shape vector calculator is configured to compensate the mode shape vector calculated by the modal analyzer based on a distance between a normal line passing through a center of a structure of the specimen and the sensed position, thereby calculating the modified mode shape vector, and wherein the modal analyzer for performing modal analysis is configured to calculate a frequency response function using a following Equation 1 based on the physical force applied to the specimen and the vibration signal measured at the sensed position of the specimen:

$$H_{mn}^i(\omega, \theta) = \frac{r_{mn}^i}{(\omega_{n,i}(\theta))^2 - \omega^2 + 2\omega\omega_{n,i}(\theta)\xi_{n,i}(\theta)j} \qquad \text{[Equation 1]}$$

where $\omega_{n,i}$ denotes a resonance frequency of an i-th mode, $\xi_i$ denotes a modal damping ratio of the i-th mode, i is a natural number, $\theta$ denotes the angle, $\omega$ denotes the frequency, $r_{mn}^i$ denotes a residual of the i-th mode, and j denotes an imaginary unit.

11. The device of claim 10, wherein the first modal assurance criterion calculator is configured to calculate the first modal assurance criterion using a following Equation 7:

$$MAC(i, j) = \frac{\left|(\varphi_i{}^m)^T(\varphi_j{}^m)^*\right|^2}{\left((\varphi_i{}^m)^T(\varphi_i{}^m)^*\right)\left((\varphi_j{}^m)^T(\varphi_j{}^m)^*\right)} \qquad \text{[Equation 7]}$$

where $(\varphi_i{}^m)^T$ denotes a transpose matrix of an i-th modified mode shape $\varphi_i{}^m$, and $(\varphi_i{}^m)^*$ denotes a conjugate matrix of the i-th modified mode shape $\varphi_i{}^m$, and $(\varphi_j{}^m)^T$ and $(\varphi_j{}^m)^*$ represent a transpose matrix and a conjugate matrix of a j-th mode shape $\varphi_j{}^m$, respectively.

12. The device of claim 10, further comprising a second modal assurance criterion calculator configured to calculate a second modal assurance criterion of the specimen based on the mode shape vector calculated by the modal analyzer.

13. The device of claim 12, wherein the second modal assurance criterion calculator is configured to calculate the second modal assurance criterion using a following Equation 8:

$$MAC(i, j) = \frac{\left|(\varphi_i)^T(\varphi_j)^*\right|^2}{\left((\varphi_i)^T(\varphi_i)^*\right)\left((\varphi_j)^T(\varphi_j)^*\right)} \qquad \text{[Equation 8]}$$

where $(\varphi_i)^T$ denotes a transpose matrix of an i-th mode shape vector $\varphi_i$ and $(\varphi_i)^*$ denotes a conjugate matrix of the i-th mode shape vector $\varphi_i$, and $(\varphi_j)^T$ and $(\varphi_j)^*$ represent a transpose matrix and a conjugate matrix of a j-th mode shape vector $\varphi_j$, respectively.

* * * * *